July 8, 1969 R. J. CLITES ET AL 3,454,904
PHASE MODULATOR FOR REDUCING KEYING TRANSIENTS
Filed Aug. 5, 1966
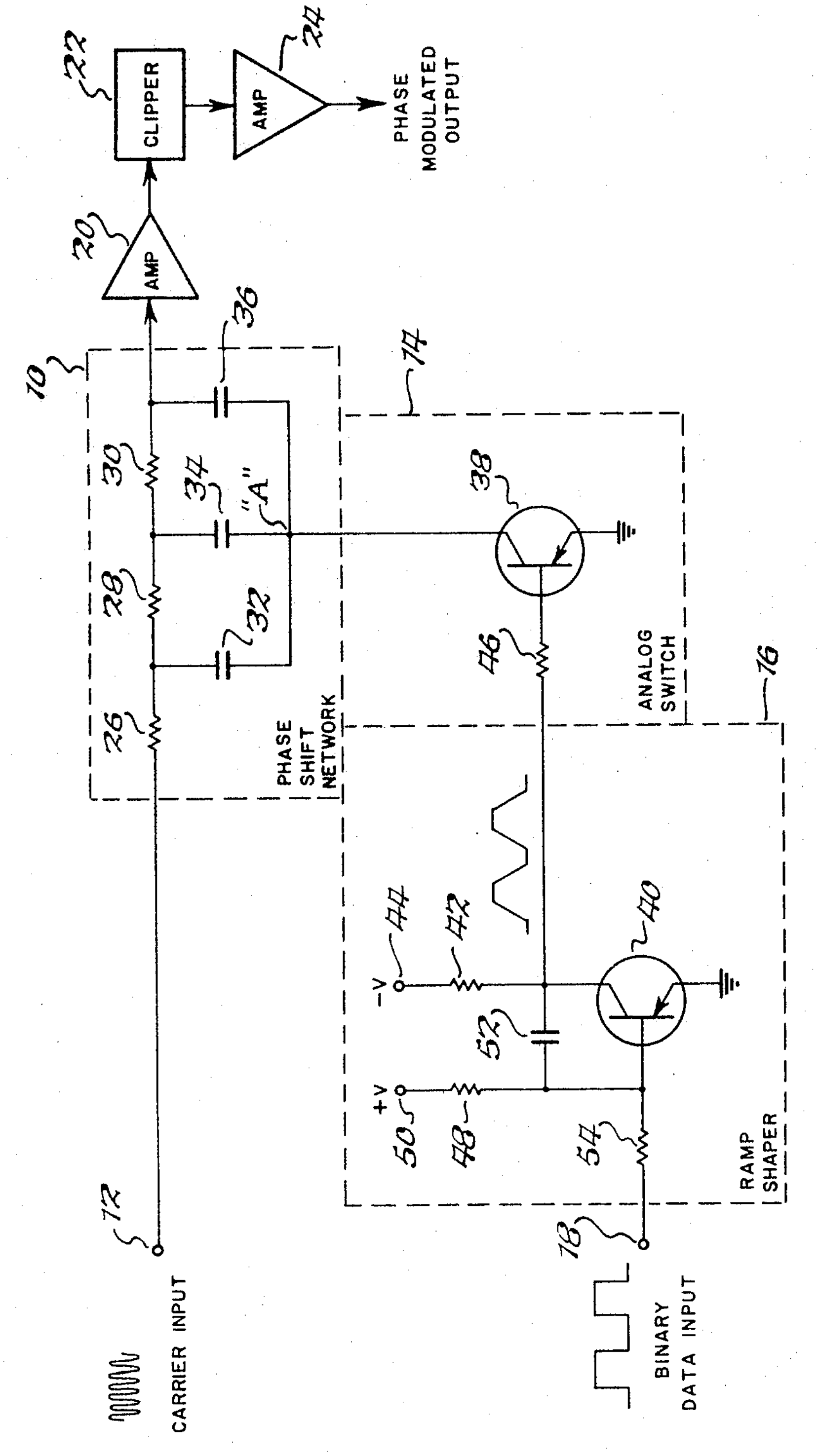

United States Patent Office 3,454,904
Patented July 8, 1969

3,454,904
PHASE MODULATOR FOR REDUCING KEYING TRANSIENTS
Roy J. Clites, Williamsville, and Phillip G. Pflueger, Cheektowaga, N.Y., assignors to Sylvania Electric Products Inc., a corporation of Delaware
Filed Aug. 5, 1966, Ser. No. 570,527
Int. Cl. H03c 3/00; H03b 5/20; H04l 27/00
U.S. Cl. 332—16 7 Claims

ABSTRACT OF THE DISCLOSURE

A phase shift modulator comprising an RC phase shift network to which a carrier input is applied, an analog switch connected between the RC network and ground for varying the phase shift provided by the RC network, and a ramp shaping circuit for controlling the analog switch, in response to a binary modulating signal.

This invention relates to phase modulators for phase shift keyed communication system, and particularly to an improved phase modulator circuit for reducing the keying transients caused by use of a binary modulating signal.

It is standard practice in phase shift keyed communication systems to employ a biphase modulator to impress binary information on a carrier wave. The phase modulator circuit usually comprises a combination of active devices and a transformer which is operative to produce abrupt 180° phase reversals in the carrier wave in response to a rectangular waveform, binary modulating signal. For example, one commonly used digital phase modulator comprises a balanced transformer having a center tap and each end serially connected through a transistor collector-emitter junction to ground. The carrier wave is applied to the balanced transformer, and the rectangular wave modulating signal is applied directly to the base of one transistor, and through an inverter to the base of the other transistor. Consequently, the modulating signal alternately saturates one transistor and cuts off the other, thereby alternately grounding opposite sides of the transformer and reversing the polarity of the carrier at the output, which is taken from the transformer center tap.

These conventional digital phase modulating techniques pose a significant transmission problem in that the abrupt phase reversals produce keying transients that in many instances exceed radio frequency interference restrictions. In low data rates communications systems, this problem is particularly significant and results in adjacent channel interefernce, unless there is relatively wide spacing between channels.

An obvious solution to this problem is to employ a band pass filter at the transmitter output. Band pass filters, however, are relatively expensive items and impose dynamic range restrictions since a given filter covers a relatively narrow frequency band; consequently, if the transmitter covers a relatively wide frequency range, a number of band pass filters would be required, the filter being changed for wide changes in operating frequency.

With an appreciation of the foregoing shortcomings of available phase shift keying systems, it is an object of the present invention to provide an improved phase modulator which is operative to reduce the keying transients caused by binary modulating signals.

It is another object of the invention to provide an economical means for minimizing adjacent channel interference in low bit rate, high power, biphase modulated transmission systems.

It is a further object of the invention to provide an improved and highly reliable phase modulator which particularly lends itself to miniaturization.

Briefly, these and related objects are achieved by a phase shift modulator comprising a ramp shaping circuit, analog switch, and RC phase shift network. In a preferred embodiment, three RC sections each having a resistive arm and a capacitive arm are serially connected between the carrier wave input and modulator output. The capacitive arms are connected together at a common junction point, and the analog switch comprises a transistor having its collector-emitter connected between that junction point and ground. The switching transistor is controlled by the output of a Miller integrator ramp shaping circuit which is driven by a binary modulating signal. With this circuit arrangement, the phase shift network is operative to provide a 180° phase shift of the applied carrier wave when the switch is in the full conducting state, a 0° phase shift when the switch is in the nonconducting state and intermediate degrees of phase shift for intermediate conducting states of the transistor switch. This mode of operation provides a decreased rate of phase change during transitions, thereby reducing spectrum bandwidth and amplitude by reducing the keying transients to acceptable levels. Further, the modulator employs no transformers thereby enhancing reliability and adaptability to miniaturization.

The invention will be more fully understood from the following description and the accompanying drawing, the single figure of which is a combined schematic and block diagram of a phase modulator in accordance with the invention.

Referring to the drawing, the improved phase modulator comprises a resistor capacitor (RC) phase shift network 10 having an input terminal 12 to which the input carrier wave is applied. The operation of the phase shift network is controlled by an analog switch 14, which in turn is controlled by a ramp shaper 16 driven by a rectangular waveform, binary modulating signal applied at data input terminal 18. As will be described in detail below, this circuit arrangement is operative to provide a modified biphase modulated carrier wave at the output of phase shift network 10 in which the binary phase transitions are marked by a relatively slow rate of change of phase. As pointed out in the summary above, the implementation of a slow phase change during phase reversals provides the desired effect of significantly reducing spurious emissions. Operation of the analog switch, however, introduces undesired amplitude variations in the modulated carrier. To counteract this effect and provide a constant amplitude carrier, the modulated output from network 10 is amplified and clipped before being applied to the transmitter. More specifically, the output of network 10 is serially connected through an amplifier 20, clipper circuit 22 and amplifier 24 to provide the final phase modulated output.

In the preferred embodiment shown, phase shift network 10 comprises three RC sections each having a resistive arm and a capacitive arm. The resistive arms, including resistors 26, 28 and 30, are serially connected between input terminal 12 and the input of amplifier 20. The capacitive arms comprising capacitors 32, 34 and 36, respectively, are connected together at a common junction point A.

Analog switch 14 comprises a transistor 38 having a collector electrode connected to junction point A and an emitter electrode connected to ground. A PNP transistor is shown; however, an NPN transistor would be equally suitable with reversed circuit polarities. The ramp shaping circuit 16 is a Miller integrator comprising a transistor 40 having its emitter connected to ground and its collector connected through resistor 42 to a source of negative supply voltage —V, represented by terminal 44, and through resistor 46 to the base of switching transistor 38. The base electrode of transistor 40 is connected through resistor 48 to a suitable source of positive supply voltage +V, represented by terminal 50, and is coupled through capacitor 52 to the collector of transistor 40. The binary data input terminal 18 is coupled to the base of transistor 40 via resistor 54.

In this particular circuit embodiment, the values of resistors 26, 28 and 30 and capacitors 32, 34 and 36 are chosen to provide a 180° phase reversal of the carrier frequency when junction point A is connected to ground, i.e., when transistor 38 is fully conducting. With the switching transistor 38 in the off state, the carrier passes through resistors 26, 28 and 30 with very little shift or attenuation. When transistor 38 is fully conducting and capacitors 32, 34 and 36 are connected to ground, the 180° phase shifted carrier is somewhat attenuated due to the current drained through the transistor. With transistor 38 in some intermediate conducting state, the effect is similar to adding capacitance to the network so that the carrier is phase shifted by more than 0° but less than 180°.

In operation, application of the rectangular wave modulating waveform via terminal 18 and coupling resistor 54 to the base of transistor 40, results in an output waveform at the collector which has a positive going ramp slope determined by the values of resistors 42 and 54 and capacitor 52, and a negative going ramp slope which is determined by resistors 42 and 48 and capacitor 52. This ramp waveform is applied through current limiting resistor 46 to control the conduction of switching transistor 38. When the ramp waveform is at its minimum voltage level, transistor 38 is fully conducting and the carrier is phase shifted 180°. When a positive transition occurs in the modulating waveform, the ramp waveform will approach its maximum voltage level in a more gradual manner causing transistor 38 to be cut off in an equally gradual manner. This gradual reduction of the current flow from junction point A to ground causes the carrier wave to be slowly changed in phase from a 180° to 0° phase shift.

With the ramp waveform at its maximum level, transistor 38 is cut off and network 10 provides a 0° phase shift in the carrier. Occurrence of a negative going transition in the binary modulating signal produces a gentle negative slope in the ramp waveform which slowly turns on transistor 38 to produce a gradual phase transition in the carrier toward a 180° phase shift.

The modulated output of network 10 is then amplified by circuit 20 and symmetrically clipped to provide a square wave output from circuit 22 having a constant amplitude level. To provide a suitable carrier modulating signal to the transmitter RF section, the clipper output is further amplified in circuit 24. In the event a sinusoidal modulated carrier wave is desired, rather than a square wave, a simple RC filter may be employed in the transmitter output.

The ramp slope determining components are selected to provide slowly changing phase transitions, the slower the phase change the more improved the radio frequency interference characteristics, but the phase change cannot be so gradual as to have an adverse effect on receiver sensitivity. Switching transistor 38 is chosen to have characteristics such that in the nonconducting state, the collector-emitter junction capacitance is small at the carrier frequency to provide a high capacitive reactance between junction point A and ground. On the other hand, when transistor 38 is full conducting, the saturation reactance should be low to provide a low impedance path between junction point A and ground. Of course, to assure reliability of operation only environmentally stable components should be employed in circuit construction.

The circuit values listed below were satisfactorily employed in a modulator constructed in accordance with the drawing to biphase modulate a carrier input signal of 450 kc. with an 8 cycles per second binary modulating signal:

| | | |
|---|---|---|
| Resistors **26**, **28** and **30** | ohms | 2,000 |
| Capacitors **32**, **34** and **36** | picofarads | 470 |
| Resistor **46** | ohms | 3,000 |
| Resistor **42** | do | 3,300 |
| Resistor **48** | do | 24,000 |
| Resistor **54** | do | 6,800 |
| Capacitor **52** | microfarad | 0.22 |
| Transistors **38** and **40** | | 2N404 |
| +V (Terminal **50**) | volts | 6 |
| −V (Terminal **44**) | do | 6 |

For a binary modulating waveform which varied between 0 to 6 volts and a ramp waveform period of 125 milliseconds, the denoted ramp generator slope determining components provided a transition period of 3 milliseconds.

The above described phase shift modulator concept may also be adapted to four phase modulation by serially connecting a 90° phase shift network with associated analog switch and ramp shaper at the output of the 180° shift network 10. A 0° shift would then be provided by cutting off both switching transistors; a 90° shift would be obtained by maintaining the 180° network switching transistor in the nonconducting state and turning on the 90° network switching transistor; a 180° phase shift would be provided by cutting off the 90° switching transistor and turning on the 180° switching transistor; and, 270° of phase shift would be provided by turning on both of the switching transistors.

It is, therefore, seen that an effective phase modulation circuit has been provided which reduces the bandwidth and amplitude of the transmitter frequency spectrum and enables adjacent transmitting channels to be more closely spaced. The modulator employs no transformers, thereby providing increased circuit reliability and adaptability to miniaturized packaging techniques. The modulator is particularly useful for high power transmitters (1500 watts) having bandwidths of the order of 100 kc. and empolying information bit rates up to 3 kc.

What is claimed is:

1. A phase modulator comprising, in combination, a phase shift network having an input to which a carrier wave is applied and an output from which the phase modulated carrier wave is produced, an analog switch connected between said phase shift network and a source of reference potential in a manner whereby said network is operative to provide maximum phase shift of the applied carrier wave when said switch is in the conducting state, minimum phase shift when said switch is in the nonconducting state and intermediate degrees of phase shift for intermediate conducting states of said switch, and a ramp shaping circuit having an input to which a binary modulating signal is applied and an output coupled to control said analog switch.

2. A phase modulator in accordance with claim 1 wherein said phase shift network is an RC network.

3. A phase modulator in accordance with claim 2 wherein said ramp shaping circuit is a Miller integrator circuit.

4. A phase modulator in accordance with claim 3 wherein said phase shift network comprises a plurality of RC sections operative to provide a 180° phase shift of the applied carrier when said switch is in the conducting state and no phase shift when said switch is in the nonconducting state.

5. A phase modulator in accordance with claim 1 further including means coupled to the output of said phase shift network for amplifying the phase modulated carrier wave produced therefrom and circuit means coupled to said last mentioned means for clipping said amplified phase modulated carrier wave.

6. A phase modulator in accordance with claim 1 wherein said phase shift network comprises a plurality of RC sections each having a resistive arm and a capacitive arm, said resistive arms being serially connected between the input and output of said network and said capacitive arms being connected together at a junction point, and wherein said analog switch comprises a transistor having collector, emitter and base electrodes, the collector of said transistor being coupled to said junction point, the emitter of said transistor being coupled to said source of reference potential and the base of said transistor being coupled to the output of said ramp shaping circuit.

7. A phase modulator in accordance with claim 6 further including a clipper circuit having input and output terminals and an amplifier connected between the output of said phase shift network and the input terminal of said clipper.

References Cited

UNITED STATES PATENTS

| | | | |
|---|---|---|---|
| 2,346,800 | 4/1944 | Usselman | 332—29 X |
| 2,777,951 | 1/1957 | Charlton | 331—137 |
| 3,054,971 | 9/1962 | Khu. | |

ALFRED L. BRODY, *Primary Examiner.*

U.S. Cl. X.R.

178—66; 307—239; 325—163; 331—135; 332—9, 15, 19